United States Patent [19]

Sagara et al.

[11] Patent Number: 5,137,400
[45] Date of Patent: Aug. 11, 1992

[54] SPINDLE CLAMPING DEVICE IN MACHINE TOOL

[75] Inventors: Makoto Sagara, Mishima; Sadamu Baba, Numazu, both of Japan

[73] Assignee: Toshiba Kikai Kabushiki Kaisha, Tokyo, Japan

[21] Appl. No.: 726,909

[22] Filed: Jul. 8, 1991

[30] Foreign Application Priority Data

Jul. 10, 1990 [JP] Japan ................ 2-182092
Sep. 27, 1990 [JP] Japan ................ 2-258623

[51] Int. Cl.$^5$ .................................... B23C 1/02
[52] U.S. Cl. .......................... 409/231; 384/29; 408/238
[58] Field of Search ............ 29/48.5 R; 408/238; 409/231, 233; 384/29, 40; 82/140

[56] References Cited

U.S. PATENT DOCUMENTS

| 3,034,408 | 5/1962 | Kampmeier | 409/231 |
| 3,103,144 | 9/1963 | Walter | 409/231 |
| 3,397,614 | 8/1968 | Meinke | 409/231 |
| 3,545,335 | 12/1970 | Lehmkuhl | 409/231 |
| 4,726,267 | 2/1988 | Brinkmann | 384/29 |

FOREIGN PATENT DOCUMENTS

| 580063 | 11/1977 | U.S.S.R. | 409/231 |
| 645811 | 2/1979 | U.S.S.R. | 409/231 |

Primary Examiner—William Briggs
Attorney, Agent, or Firm—Koda and Androlia

[57] ABSTRACT

A device for clamping coaxial, first and second spindles of a machine tool to each other. The first spindle is hollow and rotatably supported by a spindle head. The second spindle is rotatably supported in the first spindle and can be moved back and forth in the axial direction of the second spindle. The device includes a space formed between portions of both the spindles; disc springs are provided in the space to exert an axial force; and a pair of clamp rings are disposed on both sides of the springs, for clamping both the spindles to each other due to a wedge action through the force of the disc springs. An oil chamber is formed at one side of the pair of clamp rings in order to release the clamping of both the spindles when oil pressure is applied. A hydraulic pressure source is provided for supplying pressurized oil into the oil chamber through a static pressure pocket provided at the place where the first spindle is in sliding contact with a bush encircling the first spindle.

9 Claims, 7 Drawing Sheets

SPINDLE CLAMPING DEVICE IN MACHINE TOOL

BACKGROUND OF THE INVENTION

The present invention relates to a spindle clamper for a machine tool, and, more particularly, to a device for clamping two coaxial spindles of a machine tool, such as boring and milling spindles of a horizontal boring and milling machine.

Various spindle clamping devices are used for spindles of machine tools, wherein a hollow first spindle is rotatably supported in a spindle head and a second spindle is rotatably supported in the hollow first spindle so as to be movable back and forth in the axial direction thereof. In the case of horizontal boring and milling machines, in which the first spindle is a milling spindle and the second spindle is a boring spindle, clamping devices for the machine tools can be broadly divided into two types (1) and (2) which are as follows:

(1) Pressurized oil is supplied into a thin shell ring (which is similar to clamp rings described in Japanese Utility Model Publication No. Sho 62-43684) between a milling spindle rotatably supported in a spindle head and a boring spindle rotatably supported in the milling spindle to be movable back and forth in the axial direction of the boring spindle, to clamp the boring spindle to the milling spindle. When the pressurized oil is discharged from the thin shell ring, the two spindles are unclamped.

(2) A function of self-retaining pressurized oil is provided in the second spindle, that is, the boring spindle, as described in the Publication mentioned above, to clamp the milling and the boring spindles to each other. More specifically, a thin shell ring is provided between the milling spindle rotatably supported by the spindle head and the boring spindle rotatably supported in the milling spindle to be movable back and forth in the axial direction of the boring spindle An accumulator is provided to supply pressurized oil into the shell ring. An oil injection nozzle unit is provided for the accumulator, and a hydraulic oil supply unit is provided to supply oil to the injection nozzle.

As for the type (1), the pressurized oil must be always supplied or retained during the rotation of the spindles. For that reason, if the milling spindle is rapidly rotated for machining, much heat is generated at a static pressure pocket during the rotation so as to elongate the boring spindle in the axial direction thereof by thermal expansion, thereby adversely affecting the accuracy of the machining.

As for the type (2), leakage of the pressurized oil cannot be prevented during the rotation of the spindles, and the machine tool therefore cannot be operated for a long time. For that reason, machining must be stopped, the boring spindle must be positioned again at a prescribed angle, and the oil injection nozzle unit and the hydraulic oil supply unit must be matched with each other in phase, before the operation for supplying the pressurized oil into the thin shell ring is carried out. With the leakage of the pressurized oil, the pressure of the oil to be applied to the thin shell ring will drop so that it becomes difficult to securely clamp the spindles to each other with high rigidity. Moreover, since it takes some time to do the work for supplying the pressurized oil into the thin shell ring, the rate of operation of the machine tool is lowered.

SUMMARY OF THE INVENTION

The present invention was made to solve the problems mentioned above.

It is an object of the present invention to provide a spindle clamping device which enables reliable clamping, with high rigidity, of first and second spindles of a machine tool of the type in which the first spindle is rotatably supported by a spindle head and the second spindle is rotatably supported in the first spindle so as to be movable back and forth in the axial direction of the second spindle.

According to the present invention, the above object is attained by a spindle clamping device in a machine tool having a spindle head, a hollow first spindle rotatably supported in said spindle head, and a second spindle rotatably supported in said first spindle so as to be moved back and forth in the axial direction thereof, said spindle clamping device comprising: means forming an annular space between the first and second spindles; at least one set of radially inner and outer clamp rings confined within said space and having outer and inner conical surfaces, respectively, which are in sliding contact with each other, one of said inner and outer clamp rings being immovable in an axial direction of the spindles and the other clamp ring being slidable in the axial direction relative to the one clamp ring; spring means disposed within said space at one side of said slidable clamp ring with respect to the axial direction and exerting an axial force on the slidable clamp ring to thrust the same axially so as to produce a wedge effect due to said conical surfaces, thereby clamping the first and second spindles together; and means defining an annular pressure chamber between the spindles at the other side of said slidable clamp ring, said pressure chamber being connected to a hydraulic pressure source and, upon introduction of hydraulic pressure thereinto, exerting an axial force opposite to said axial force of the spring means, thereby shifting the slidable clamp ring to unclamp the spindles.

DETAILED DESCRIPTION OF THE PREFERRED EMBODIMENTS

Embodiments of the present invention will hereafter be described in detail with reference to the accompanying drawings.

Figure 1:
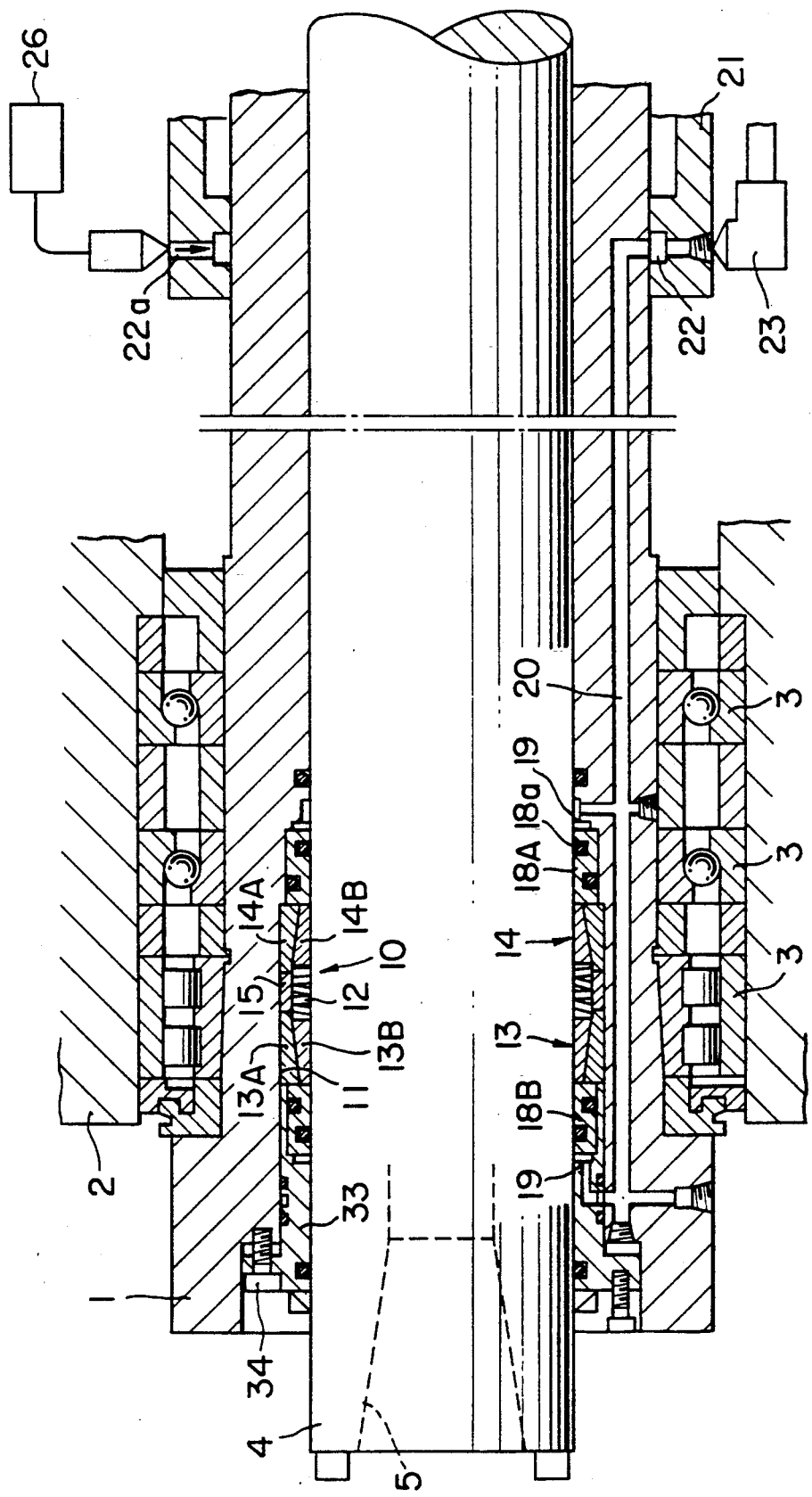
FIG. 1 is a sectional view of a spindle clamping device constituting an embodiment of the present invention.

FIG. 1 shows a spindle clamping device 10, according to an embodiment of the present invention, for clamping spindles of a machine tool. The machine tool shown is a horizontal boring and milling machine having a hollow milling spindle 1 as a first spindle and a boring spindle 4 as a second spindle. The milling spindle 1 is rotatably supported in bearings 3 within a spindle head 2. The boring spindle 4 is rotatably supported in the hollow milling spindle 1 in such a manner that the boring spindle 4 can be moved back and forth in the axial direction thereof by a drive mechanism not shown in the drawings. The boring spindle 4 has a socket 5 at the tip of the spindle. A tool can be fitted in the socket 5 and be replaced with another tool depending on the kind of machining operation carried out by the machine.

As shown, the device 10 includes an annular space 11, disc springs 12, clamp rings 13 and 14, a collar 15, seal members 18 (18A and 18B), O-rings 18a, static pressure chambers 19, an oil passage 20, an oil pressure bush 21, a coupling 23, a hydraulic pressure source not shown in the drawings, a compressed air source 26, and a cylindrical closure member 33. These elements will be described below in detail.

The annular space 11 is formed in the milling spindle 1 so as to open radially inwardly and located between the boring spindle 4 and the milling spindle. The disc springs 12 are provided as an elastic means in the annular space 11 so as to act for clamping the milling and the boring spindles 1 and 4 with each other. The clamp rings 13 and 14 are fitted at both sides of the assembly of the disc springs 12. The clamp rings 13 and 14 consist of tapered outer rings 13A and 14A and tapered inner rings 13B and 14B, and differ from each other in that the inclinations of their mutually contacting tapering or conical surfaces are opposite. The inner rings 13B and 14B can be moved in the axial direction of the boring spindle 4, but the outer rings 13A and 14A are restrained from moving in that direction due to the provision of the collar 15 therebetween. The clamp rings 13 and 14 are used to clamp the milling and the boring spindles 1 and 4 through the action of the disc springs 12, as will be described later in detail.

The clamp rings 13 and 14 have the same form and structure. Therefore, only the clamp ring 13 will be described in detail with reference to FIG. 2. The clamp ring 13 consists of the outer ring 13A and the inner ring 13B whose conical tapering surfaces face each other in contact and which are movable relative to each other in the axial direction of the boring spindle 4. The inside surface of the inner ring 13B has an oil removing groove 16 spirally extending along the circumference of the surface. The inner ring 13B has slits 17 provided at equal intervals along the circumference of the ring and each extending toward one side of the ring along the axis thereof. The outer ring 13A is restrained in the annular space 11 so as not to be movable in the axial direction of the milling spindle 1, but the inner ring 13B is movable in that direction.

The collar 15 is provided between the outer rings 13A and 14A to adjust the force of the disc springs 12 when the clamp rings 13 and 14 are fitted in the annular space 11. The seal members 18 are provided in the annular space 11 and are in constant contact with the milling and the boring spindles 1 and 4 through the O-rings 18a. The seal members 18 are in contact with the inner rings 13B and 14B at one side of each of the seal members, and are in adjoining relation with the static pressure chamber 19 at the other side of each of the seal members.

The static pressure chamber 19 are provided in the milling spindle 1, and communicate with the oil passage 20 provided in the spindle. An oil inlet port of the oil passage 20 is in sliding contact with the oil pressure bush 21 secured to the spindle head 2. A static pressure pocket 22 is provided in the inside circumferential surface of the oil pressure bush 21, and connected to an oil feed port of the hydraulic pressure source through the coupling 23. The static pressure pocket 22 is provided with an air hole 22a for supplying compressed air into the pocket. The air hole 22a is connected to the compressed air source 26 which is for intermittently supplying compressed air into the pocket 22 through the air hole 22a.

The closure member 33 is secured to the milling spindle 4 at the front end thereof by bolts 34.

Figure 3:
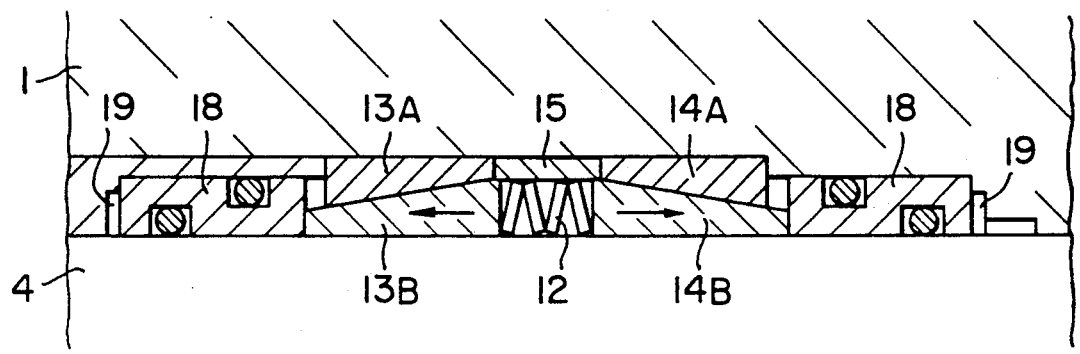
FIG. 3 is a partial sectional view, on an enlarged scale, of the device of FIG. 1 to show that first and the second spindles are clamped to each other.

The operation of the device 10 will be described below in detail. To clamp the milling and the boring spindles 1 and 4 to each other, supply of hydraulic oil from the hydraulic pressure source to the static pressure chamber 19 through the oil passage 20 is stopped to prevent the pressure of the oil from acting in the chambers. As a result, the force of the disc springs 12 displaces the inner rings 13B and 14B in such directions as to move them away from each other, as indicated by arrows in FIG. 3. For that reason, a wedge effect is produced on the outer and the inner rings 13A, 14A, 13B and 14B due to the tapering surfaces thereof so that the milling and the boring spindles 1 and 4 are clamped to each other. As a result of the clamping, the slits 17 of the inner rings 13B and 14B are compressed in the circumferential direction thereof and the tapering surfaces of the inner and the outer rings are thrust against each other. Since the inside surfaces of the inner rings 13B and 14B have the oil removing grooves 16, the oil on the outside circumferential surface of the boring shaft 4 is removed from the surface during the movement of the inner rings so that the inner rings come into metal-to-metal contact with the boring spindle so as not to slip relative to the boring spindle during the clamping of both the spindles to each other. Since the milling and the boring spindles 1 and 4 are thus immovably coupled to each other with the clamp rings 13 and 14 therebetween, the assembly of them is high enough in rigidity.

Figure 4:
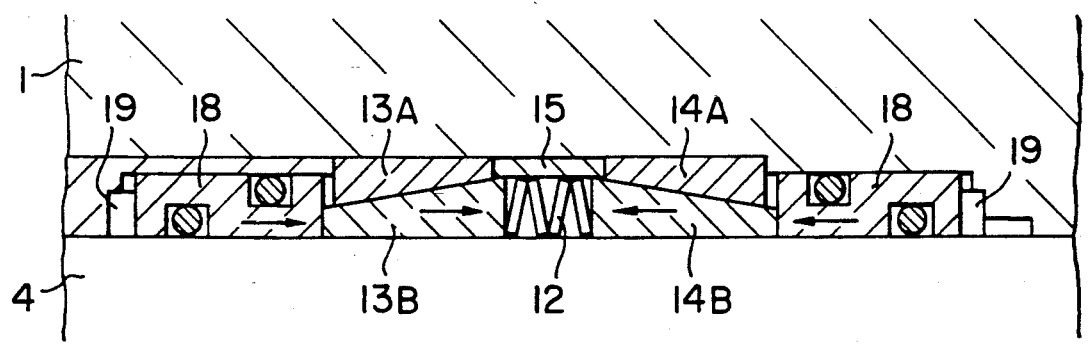
FIG. 4 is a partial sectional view, on an enlarged scale, of the device of FIG. 1 to show that the first and the second spindles are unclamped from each other.

To unclamp the milling and the boring spindles 1 and 4 to each other, the hydraulic oil is supplied from the hydraulic pressure source to the static pressure chambers 19 through the coupling 23, the static pressure pocket 22 of the bush 21 and the oil passage 20 so that, as shown in FIG. 4, axial external forces are applied to the inner rings 13B and 14B against the force of the disc springs 12 through the seal members 18 disposed in contact with the spindles through the O-rings 18a. As a result, the inner rings 13B and 14B are moved toward each other against the force of the disc springs 12 by the hydraulic pressure in the static pressure chambers 19, as shown in FIG. 4, so that the inner rings are relieved from thrusting against the outer rings 13A and 14A. For that reason, no clamping force acts on the milling and the boring shafts 1 and 4, so that the clamping is released.

If hydraulic pressure is present in the static pressure pocket 22 during the rotation of the milling spindle 1 clamped to the boring spindle 4, heat is generated due to the shearing of the oil between the milling spindle and the oil pressure bush 21. For that reason, the compressed air is intermittently supplied from the compressed air source 26 to the static pressure pocket 22 through the air hole 22a during the operation of the machine to remove the static pressure oil from the static pressure pocket to hold down the generation of the heat to keep the thermal expansion of the spindles 1 and 4 low.

Figure 5:
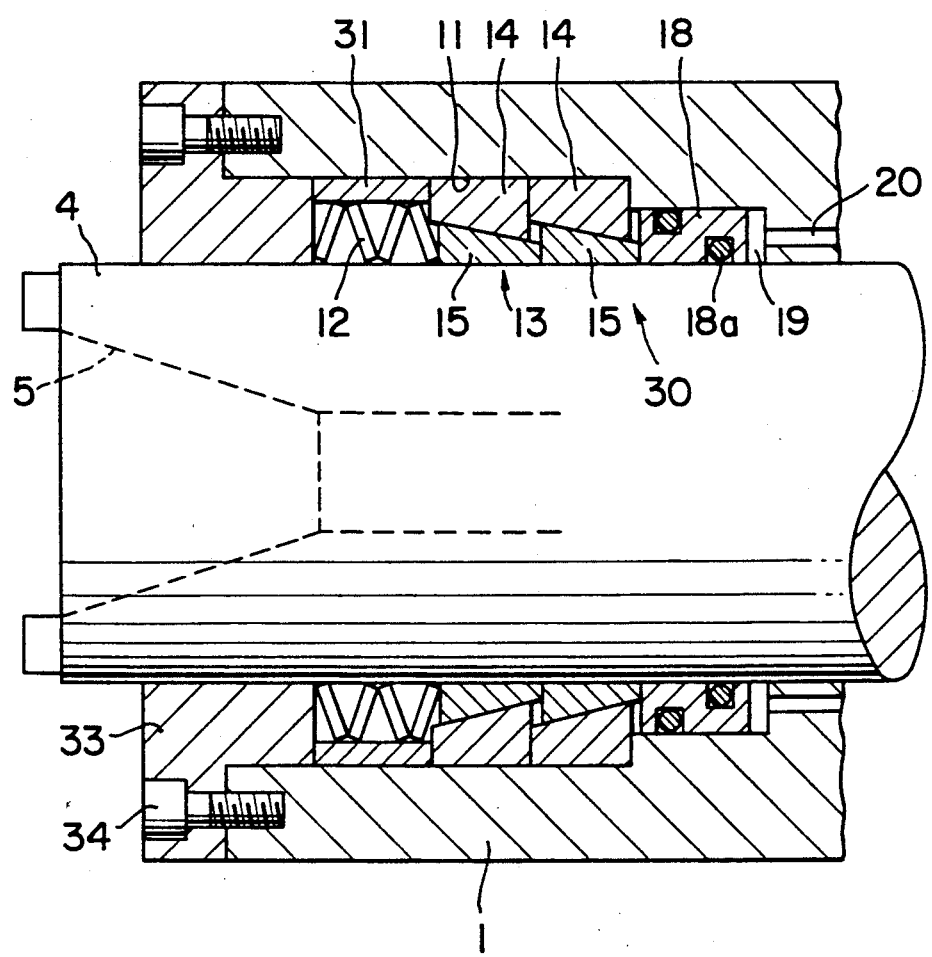
FIG. 5 is a sectional view of a spindle clamping device constituting another embodiment of the present invention.

FIG. 5 shows a spindle clamping device 30, according to another embodiment of the present invention, for clamping a milling spindle 1 and a boring spindle 4 to each other. The device 30 includes an annular space 11 formed in the milling spindle 1 and located between the boring spindle 4 and the milling spindle 1, disc springs 12 provided in the space 11 so as to act to clamp the spindles to each other, and clamp rings 13 consisting of outer and inner rings 14 and 15 and disposed at one side of the assembly of the disc springs so as to act to clamp the spindles to each other. A collar 31 serves to set the outer rings 14 immovably. Because of the constitution described above, the number of the components of the device 30 is smaller than that of the components of the preceding device 10. Since the tapering surfaces of the clamp rings 13 taper to become lower toward the right as viewed in FIG. 5, the clamping state of the device 30 sufficiently withstands a machining force, as in drilling, which acts on the device rightward with regard to FIG. 5. The device 30 is the same in other respects as the preceding device 10, and therefore will not be described further.

Figure 6:
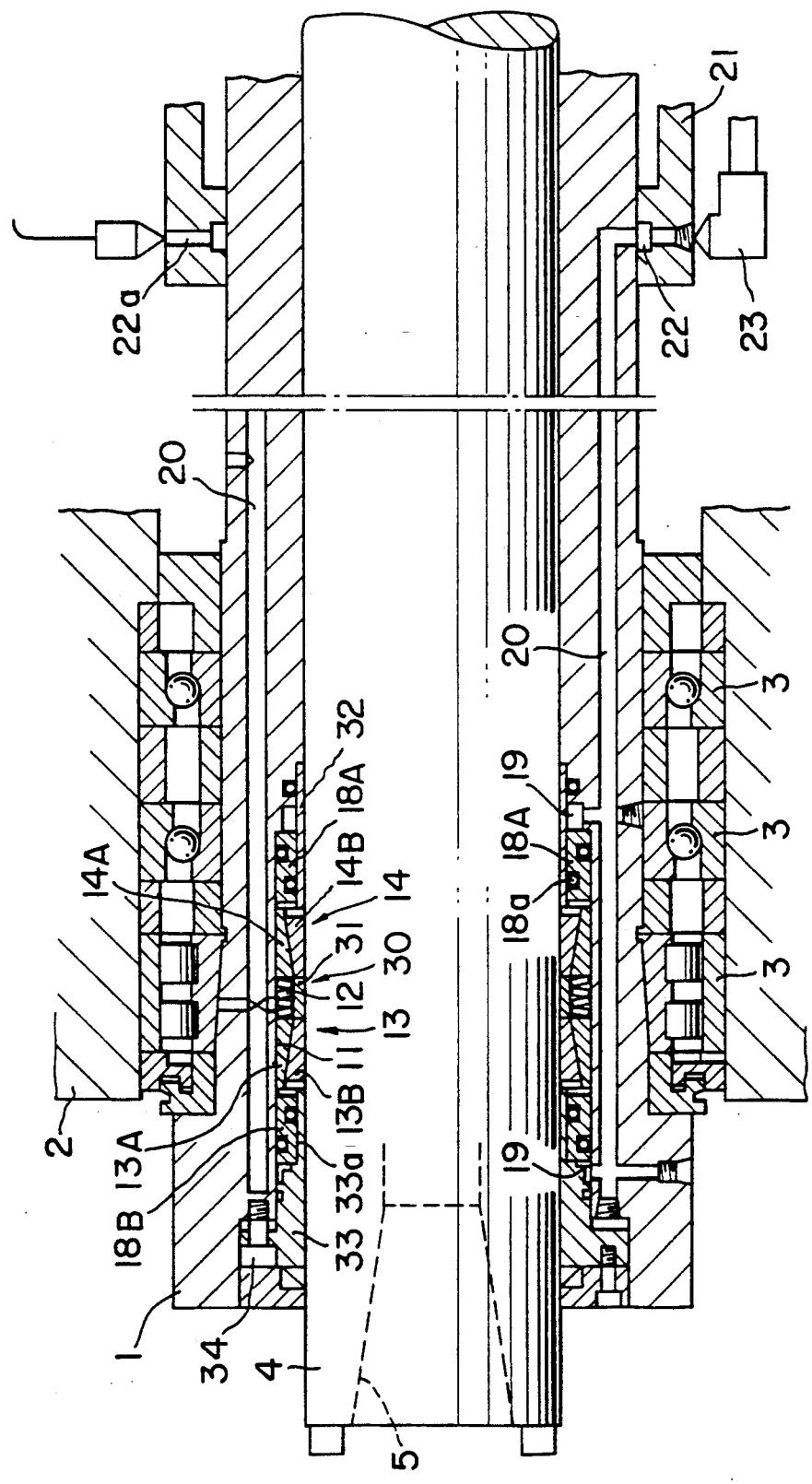
FIG. 6 is a sectional view of a spindle clamping device constituting yet another embodiment of the present invention.

FIG. 6 shows a device 30, according to yet another embodiment of the present invention, for clamping a milling spindle 1 and a boring spindle 4 to each other through the use of clamp rings 13 and 14. Since the device 30 is a modification of the preceding device 10, their mutually equivalent portions are denoted by the same reference symbols herein and in the drawings. As for the device 30, each of O-rings 18a on seal members 18A and 18B is prevented from exerting a resistance to the movement of the boring spindle 4, which resistance makes it impossible to accurately position the spindle. The device 30 includes an annular space 11, disc springs 12, the clamp rings 13 and 14, the seal members 18A and 18B, static pressure chambers 19, an oil passage 20, an oil pressure bush 21, a static pressure pocket 22, a coupling 23, sleeves 31 and 32, a cylindrical closure member 33, a hydraulic pressure source not shown in the drawings, and a compressed air source also not shown.

The annular space 11 is formed in the milling spindle 1 and located between the boring spindle 4 and the milling spindle. The disc springs 12 are fitted around the annular spacer 31 fitted on the boring spindle 4. The clamp rings 13 and 14 consist of outer rings 13A and 14A and inner rings 13B and 14B, and are fitted on both sides of the assembly of the disc springs 12. The seal members 18A and 18B are fitted at both sides of the assembly of the clamp rings 13 and 14 and the disc springs 12. The seal member 18A is in contact through the O-ring 18 with the spacer sleeve 32 fitted on the boring spindle 4. One side of the seal member 18A is in contact with the outer ring 14A. The other side of the seal member 18A is in adjoining relation with the static pressure chamber 19. The other seal member 18B is in contact through the other O-ring 18a with an extending portion 33a of the cylindrical closure member 33 fitted on the boring spindle 4. The closure member 33 is secured to the milling spindle 1 at the front end thereof by bolts 34. One side of the latter seal member 18B is in contact with the outer ring 13A. The other side of the seal member 18B is in adjoining relation with the other static pressure pocket 19.

Figure 2:
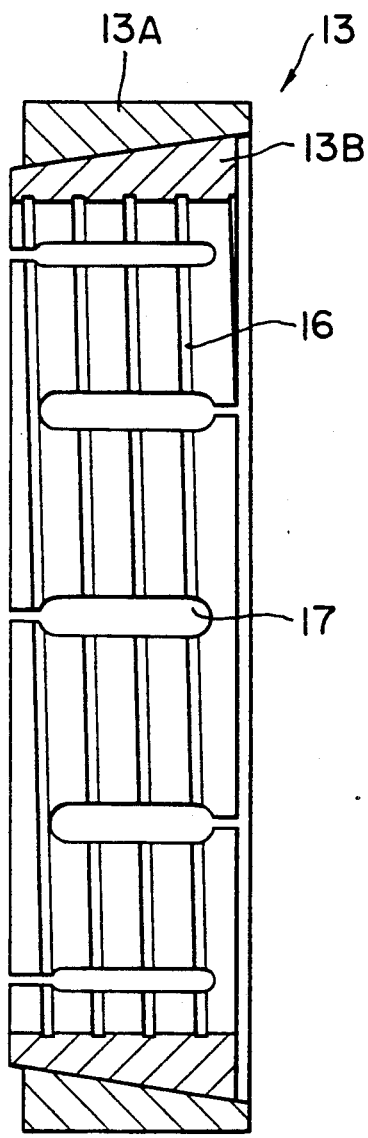
FIG. 2 is a sectional view of a clamp ring consisting of an inner and an outer ring.

The clamp rings 13 and 14 are shaped similarly to those of the device 10 shown in FIGS. 1 and 2, but differ therefrom in that the slopes of their tapering surfaces are opposite. The inner rings 13B and 14B are restrained in the annular space 11 so as not to be movable, but the outer rings 13A and 14A can be moved in the axial direction of the boring spindle 4.

The static pressure chambers 19 communicate with the oil passage 20 provided in the milling shaft 1. The oil inlet port of the oil passage 20 is in sliding contact with the oil pressure bush 21 secured to a spindle head 2 which supports the milling and the boring spindles 1 and 4. The inside circumferential surface of the bush 21 has the static pressure pocket 22 connected to the hydraulic pressure source through the coupling 23. When pressurized oil is supplied from the hydraulic pressure source to the static pressure pockets 19 through the coupling 23, the static pressure pocket 22 and the oil passage 20, the assembly of the disc springs 12 is compressed by the pressure of the oil through the action of the seal members 18A and 18B and the outer rings 13A and 14A so that the clamping of the milling and the boring spindles 1 and 4 to each other with the clamp rings 13 and 14 is released.

The operation of the device 30 shown in FIG. 6 will be described below in detail. To clamp the milling and the boring spindles 1 and 4 to each other, supply of the pressurized oil from the hydraulic pressure source to the static pressure pockets 19 is stopped so that the pressure of the oil is not applied to the pockets. As a result, the outer rings 13A and 14A are moved away from each other in the axial direction of the spindle 4 by the forces of the disc springs 12 so that wedge effects are produced on the outer and the inner rings 13A, 14A and 13B and 14B due to their tapering surfaces so that the milling and the boring spindles 1 and 4 are clamped to each other. At that time, the slits 17 of the inner rings 13B and 14B are compressed in the circumferential directions thereof, and the tapering surfaces of the outer rings 13A and 14A push those of the inner rings. Since the outside circumferential surfaces of the outer rings 13A and 14A have oil removing grooves 16 for removing the oil from the inside circumferential surface of the milling spindle 1 during the movement of the outer rings, the rings come into metal-to-metal contact with the milling spindle as a result of the movement of the rings so that the milling spindle and the boring spindle 4 are clamped to each other because the rings do not slip on the milling spindle.

To unclamp the milling and the boring spindles 1 and 4 to each other, the pressurized oil is supplied from the hydraulic pressure source to the static pressure chambers 19 through the coupling 23, the static pressure port 22 and the oil passage 90 so that axial external forces are applied to the outer rings 13A and 14A by the oil through the action of the seal members 18 against the forces of the disc springs 12. At that time, the pressure of the oil in the static pressure chambers 19 moves the outer rings 13A and 14A toward each other against the forces of the disc springs 12 so that the spindle clamping forces are eliminated from the clamp rings 13 and 14. As a result, the spindles 1 and 4 become unclamped with respect to each other.

Figure 7:
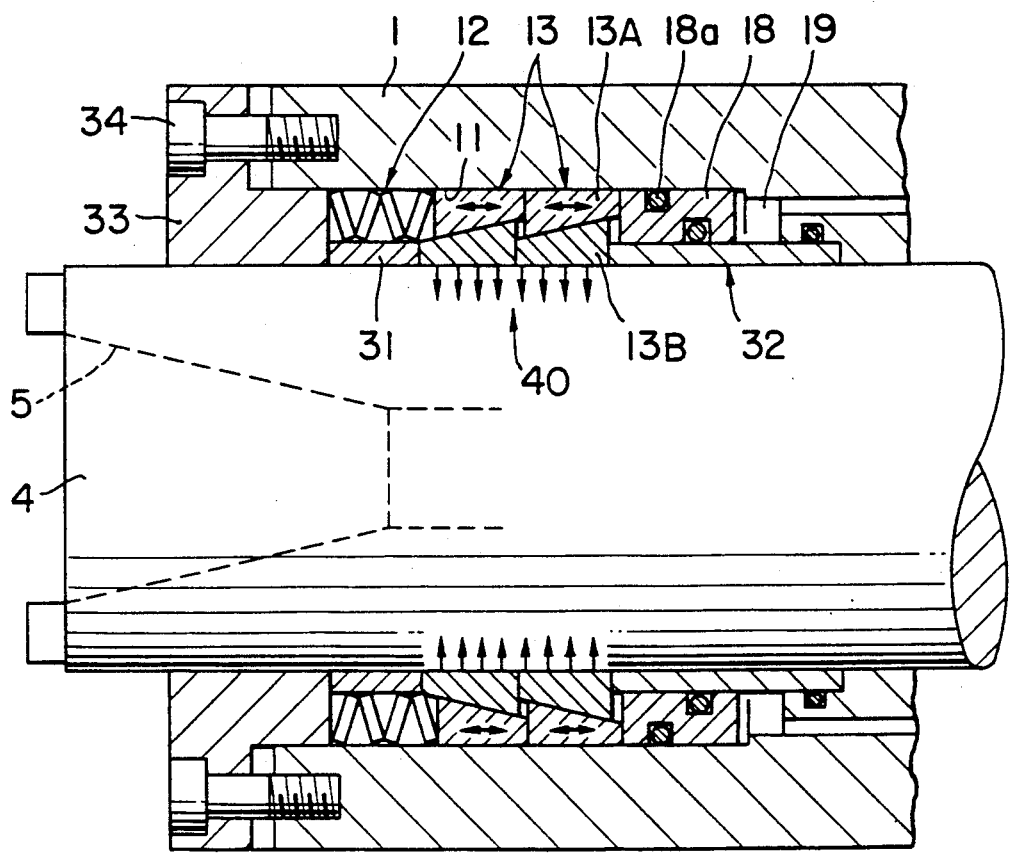
FIG. 7 is a sectional view of a spindle clamping device constituting a yet further embodiment of the present invention.

FIG. 7 shows a device 40, according to a yet further embodiment of the present invention, for clamping a milling spindle 1 and a boring spindle 4 to each other through the use of clamp rings 13. Since the device 40 is a modification of that 30 shown in FIG. 5, the mutually equivalent portions of the devices are denoted by the same reference symbols herein and in the drawings. As for the device 40, each of O-rings 18a on a seal member 18 is prevented from exerting a resistance to the movement of the milling spindle 1, which resistance makes it impossible to accurately position the spindle through the movement. The device 40 includes an annular space 11, disc springs 12, the clamp rings 13, the seal member 18, the O-rings 18a, a static pressure chamber 19, and annular spacers 31 and 32. The annular space 11 is formed in the milling spindle 1 and located between the boring shaft 4 and the milling spindle. The disc springs 12 are fitted between the milling spindle 1 and the annular spacer 31 fitted on the boring spindle 4. The clamp rings 13 consist of outer rings 13A and inner rings 13B, and are provided on one side of the assembly of the disc springs 12 so as to act to clamp the milling spindle 1 and the boring spindle 4 to each other. The seal member 18 is provided in the annular space 11, and has the O-rings 18a, one of which is on the milling spindle 1 and the other of which is on the spacer sleeve 32 fitted on the boring spindle 4. One side of the seal member 18 is in contact with the outer ring 13A. The other side of the seal member 18 is in adjoining relation with the static pressure pocket 19. The device 40 is the same in operation as the device 30 shown in FIG. 6.

Figure 8:
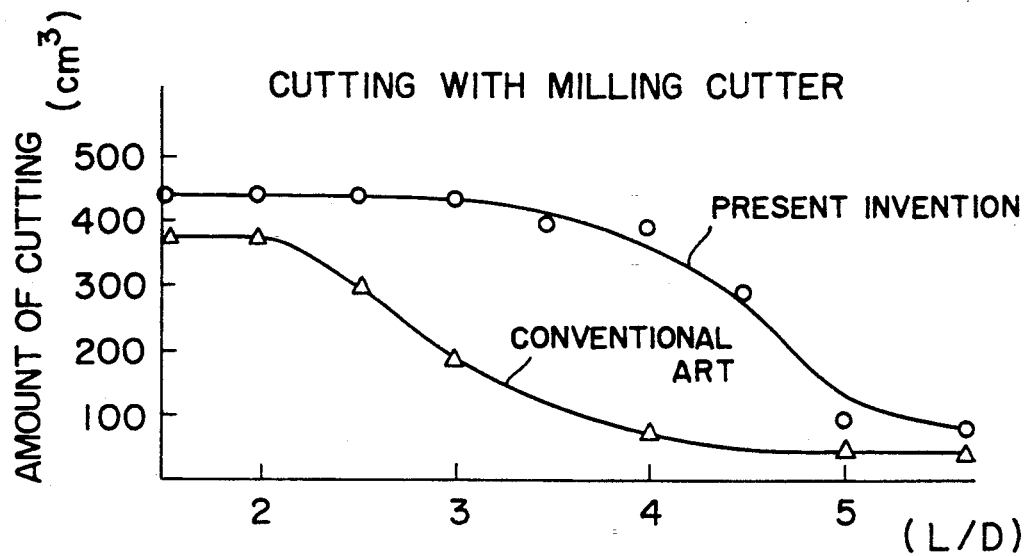
FIG. 8 is a graph showing the cutting amount of a machine tool with a milling cutter and a spindle clamping device provided in accordance with the present invention, in comparison with the cutting amount of the machine tool with the milling cutter and a conventional spindle clamping device.
Figure 9:
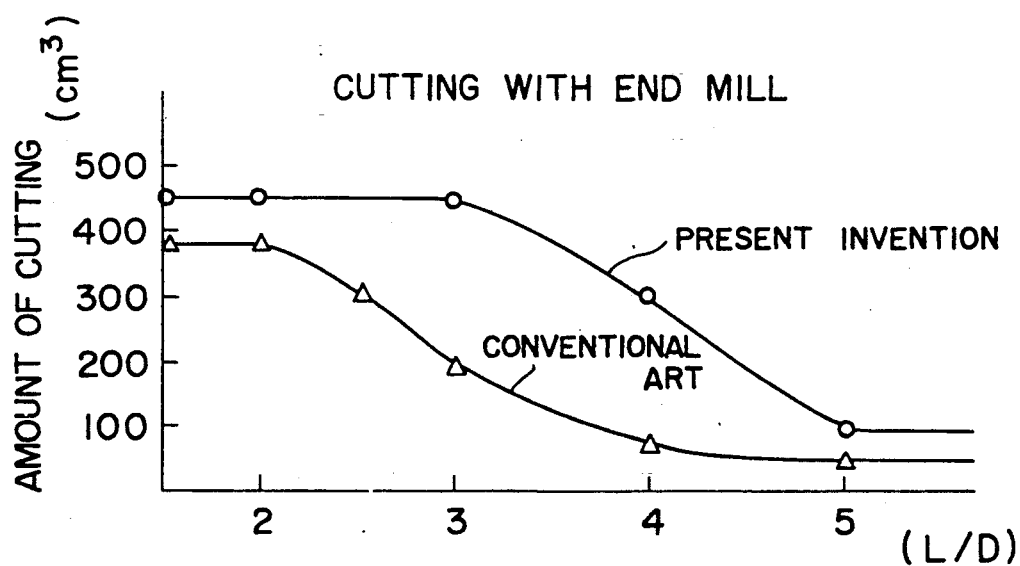
FIG. 9 is a graph showing the cutting amount of a machine tool with an end mill and the spindle clamping device provided in accordance with the present invention, in comparison with the cutting amount of the machine tool with the end mill and a conventional spindle clamping device.

FIG. 8 shows the cutting amount of a machine tool with a milling cutter and a spindle clamping device provided in accordance with the present invention, in comparison with the cutting amount of the machine tool with the milling cutter and a conventional spindle clamping device. FIG. 9 shows the cutting amount of the machine tool with an end mill and the spindle clamping device provided in accordance with the present invention, in comparison with the cutting amount of the machine tool with the end mill and the conventional spindle clamping device. The axis of abscissas in each of FIGS. 8 and 9 indicates the amount (cm³) of cutting by the machine tool. The axis of ordinates in each of FIGS. 8 and 9 indicates the ratio L/D of the length L of the boring spindle of the machine tool from the tip of the milling spindle thereof, to the diameter D of the boring spindle. It is understood from FIGS. 8 and 9 that the cutting amount of the machine tool with the milling cutter and the spindle clamping device provided in accordance with the present invention is about twice as much as that of the machine tool with the milling cutter and the conventional spindle clamping device, and the cutting amount of the machine tool with the end mill and the former device is about four times as much as that of the machine tool with the end mill and the latter device. Therefore, good results are obtained through the use of the former device in both the cases.

The present invention is not limited to the embodiments described above, but may be embodied or practiced in other various ways without departing from the spirit or essential character of the invention.

What is claimed is:

1. A spindle clamping device in a machine tool having a spindle head, a hollow first spindle rotatably supported in said spindle head, and a second spindle rotatably supported in said first spindle so as to be moved back and forth in the axial direction thereof, said spindle clamping device comprising:

means forming an annular space between the first and second spindles;

at least one set of radially inner and outer clamp rings confined within said space and having outer and inner conical surfaces, respectively, which are in sliding contact with each other, one of said inner and outer clamp rings being immovable in an axial direction of the spindles and the other clamp ring being slidable in the axial direction relative to the one clamp ring;

spring means disposed within said space at one side of said slidable clamp ring with respect to the axial direction and exerting an axial force on the slidable clamp ring to thrust the same axially so as to produce a wedge effect due to said conical surfaces, thereby clamping the first and second spindles together;

means defining an annular pressure chamber between the spindles at the other side of said slidable clamp ring, said pressure chamber being connected to a hydraulic pressure source and, upon introduction of hydraulic pressure thereinto, exerting an axial force opposite to said axial force of the spring means, thereby shifting the slidable clamp ring to unclamp the spindles; and a seal member fitted on the outer surface of the second spindle slidably in the axial direction and interposed between said pressure chamber and the slidable clamp ring to transmit the force produced by the pressure in the chamber to the slidable clamp ring.

2. The spindle clamping device according to claim 1, wherein said annular space is formed in the inner surface of the hollow first spindle.

3. The spindle clamping device according to claim 1, wherein said spring means is a set of disc springs.

4. The spindle clamping device according to claim 1, wherein said immovable clamp ring is set axially immovably by means of a collar fitted in said annular space.

5. A spindle clamping device in a machine tool having a spindle head, a hollow first spindle rotatably supported in said spindle head, and a second spindle rotatably supported in said first spindle so as to be moved back and forth in the axial direction thereof, said spindle clamping device comprising:

means forming an annular space between the first and second spindles;

at least one set of radially inner and outer clamp rings confined within said space and having outer and inner conical surfaces, respectively, which are in sliding contact with each other, one of said inner and outer clamp rings being immovable in an axial direction of the spindles and the other clamp ring being slidable in the axial direction relative to the one clamp ring, said inner clamp ring having in the inner surface thereof oil removing grooves extending circumferentially of the inner clamp ring and compressibly closable axial slits disposed in parallel relation;

spring means disposed within said space at one side of said slidable clamp ring with respect to the axial direction and exerting an axial force on the slidable clamp ring to thrust the same axially so as to produce a wedge effect due to said conical surfaces, thereby clamping the first and second spindles together; and means defining an annular pressure chamber between the spindles at the other side of said slidable clamp ring, said pressure chamber being connected to a hydraulic pressure source and, upon introduction of hydraulic pressure thereinto, exerting an axial force opposite to said axial force of the spring means, thereby shifting the slidable clamp ring to unclamp the spindles.

6. The spindle clamping device according to claim 1, further comprising a sleeve fitted in the inner surface of the hollow first spindle to separate the seal member and the pressure chamber from the second spindle.

7. The spindle clamping device according to claim 1, further comprising an oil passage formed in the first spindle to connect the pressure chamber to the hydraulic pressure source.

8. The spindle clamping device according to claim 7, further comprising an oil pressure bush encircling the first spindle in sliding sealed contact with the first spindle, said bush having a static pressure pocket which is in constant communication with said oil passage in the first spindle and which is connected to the hydraulic pressure source.

9. The spindle clamping device according to claim 8, further comprising an air hole provided in said bush to supply compressed air into the pressure pocket, thereby to remove pressure oil from the pressure pocket to suppress heat generation.

* * * * *